Feb. 20, 1923.
F. X. NOWAK.
PROCESS OF MAKING HYPODERMIC SYRINGES.
FILED NOV. 3, 1919.
1,445,641.
2 SHEETS—SHEET 1.
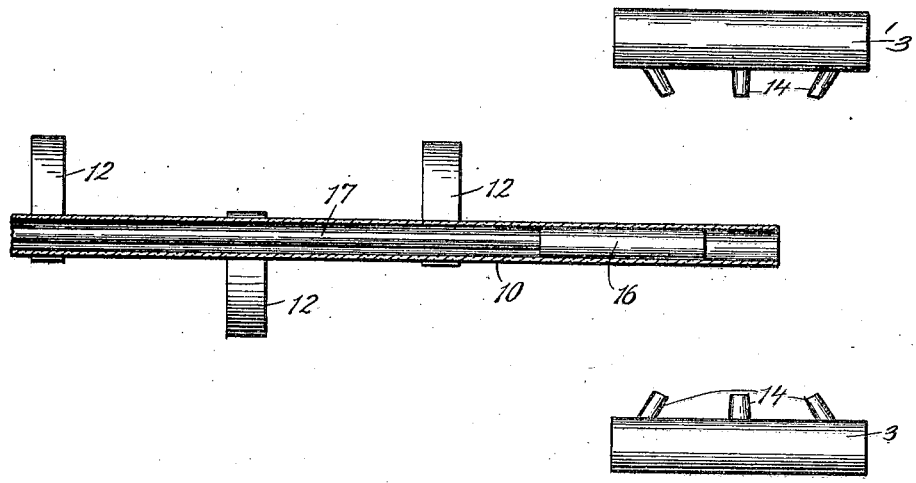
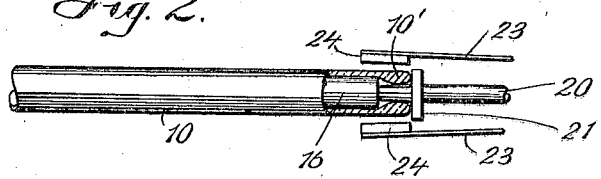
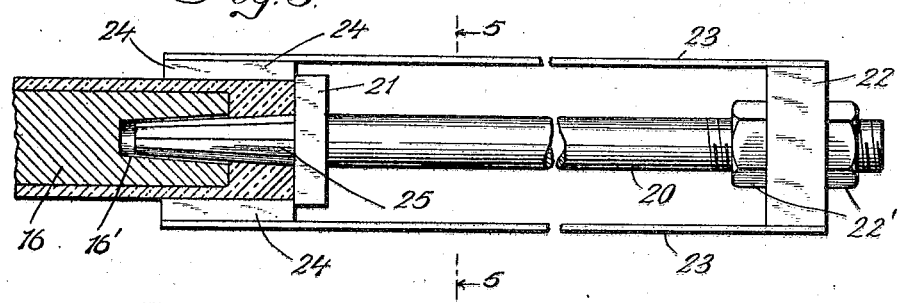
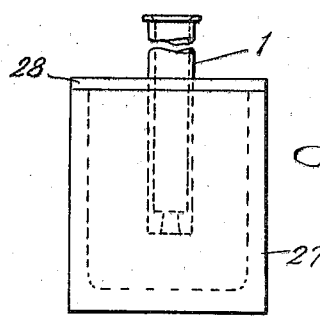
Inventor
FRANK X. NOWAK
By his Attorney Feb. 20, 1923. 1,445,641.
F. X. NOWAK.
PROCESS OF MAKING HYPODERMIC SYRINGES.
FILED NOV. 3, 1919.
2 SHEETS—SHEET 2.
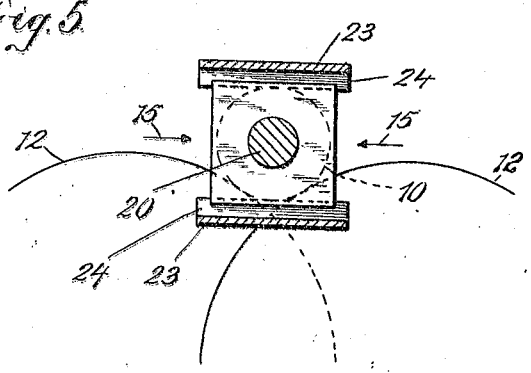
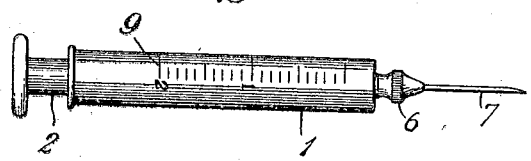
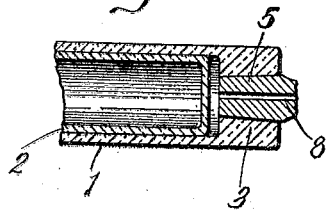
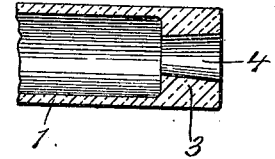
Inventor
FRANK X. NOWAK
By his Attorney Patented Feb. 20, 1923.

1,445,641

UNITED STATES PATENT OFFICE.

FRANK X. NOWAK, OF BROOKLYN, NEW YORK.

PROCESS OF MAKING HYPODERMIC SYRINGES.

Application filed November 3, 1919. Serial No. 335,393.

*To all whom it may concern:*

Be it known that I, FRANK X. NOWAK, a citizen of Republic of Austria, residing at Brooklyn, N. Y., county of Kings, and State of New York, have invented certain new and useful Improvements in Processes of Making Hypodermic Syringes, of which the following is a specification.

This invention relates to hypodermic syringes, and to a process of making the same, the invention relating particularly to the making of hypodermic syringes having ground glass bodies.

Such ground glass syringes as have heretofore been constructed or suggested have been disadvantageous in various ways such as inability to accurately measure the amount of liquid discharged, or difficulty in removing the needle carrying element for cleaning purposes. These syringes have been constructed with their nozzle ends in the form of a frustum of a cone projecting from the end of the syringe body, the needle carrying element being adapted to fit over such projection. Great difficulty is sometimes found in removing the needle carrying element for cleaning or other purposes, the adhesion between the parts being so great that the cone-shaped projecting end is frequently broken off.

The present invention has for its object the production of a hypodermic syringe having a glass body which permits both of accurate measuring of the liquid discharged and of ready removal of the needle carrying element without danger of breaking the glass body.

The practical carrying out of my invention is effected by following out a novel process whereby the forward end of the glass body is given a shape which is novel in glass syringe bodies and which was impossible of production with the ordinary methods of making these glass bodies.

In the accompanying drawings I will illustrate an apparatus suitable for carrying out my novel process and the syringe as obtained by following out this process.

Figure 1 of the drawings is a plan view of the apparatus, omitting the hand operated forming tool.

Figure 2 is a fragmentary elevation showing the initial stage in the forming operation.

Figure 3 is an enlarged fragmentary longitudinal sectional view, showing the completed step of the forming operation.

Figure 4 is an elevation of the cooling device.

Figure 5 is a transverse section on the line 3—3 of Fig. 3.

Figure 6 is a side view of the syringe complete.

Figure 7 is an enlarged fragmentary longitudinal section of the syringe.

Figure 8 is a similar view of the glass body alone.

I will first described the syringe itself and then the process of making it. The syringe comprises a cylinder or body 1 of glass which is open at one end to receive the piston or plunger 2 also of glass. The opposite end of the cylinder is provided with a thickened end wall 2 which extends straight across such end. This end wall has a tapered axial opening 4 therethrough into which is fitted the correspondingly tapered end 5 of the carrier 6 for the needle, the needle being fixed in the carrier in the usual manner while the usual aperture 8 extends through both needle and carrier. The cylinder 1 preferably has a series of graduations 9 on the wall thereof which may indicate the quantity of liquid in the syringe in cubic centimeters or in any other desired measurement.

With the construction of cylinder as here shown, with the flat thickened end wall apertured to receive the needle carrier an ideal arrangement is provided. The amount of liquid discharged can be accurately measured, the entire contents of the syringe can be discharged, and the needle holder can be easily removed by inserting a suitable implement in the open end of the cylinder and tapping on the end of the needle holder.

In order to enable this particular form of glass syringe body to be produced I have devised a novel method of procedure, operating with an apparatus which also presents features of novelty.

The syringe bodies are formed from a length of glass tubing 10 which is freely supported by a series of rollers 12 staggered as shown in Figs. 1 and 5 so as to provide opposed inclined surfaces between which the tubing rests. These rollers are mounted to rotate freely on any suitable frames.

The glass tubing 10 is arranged with its end to be operated on extending between a pair of air pressure gas burners 13, having tips 14 arranged to direct the flames to points diametrically opposed on the glass tubing, as indicated by the arrows 15. Within the glass tubing near the end to be operated on, is an asbestos plug 16 which may for convenience be carried on the end of a rod 17 projecting through the tubing.

The end of the glass tubing projects beyond the plug 16 a distance determined by experiment to be sufficient to provide the requisite amount of glass for forming the end of the syringe body. The end faces of plug 16 forms one of the walls between which the glass is worked or pressed to produce the desired structure, the other walls being provided by a specially designed tool which is shown most clearly in Fig. 3.

This tool comprises a rod or bolt 20 having an integral square flange 21 near one end thereof and a square block 22 adjustably held on the opposite end by the nuts 22'. Secured to the block 22 are the rear ends of a pair of flat springs 23 which extend forwardly beyond the flange 21 for a distance and have square inwardly facing plates 24 on their forward ends, these plates having flat faces.

The portion of the bolt in front of the flange is in the form of a tapering pin 25, a taper of 88 to 1,000 being suitable. This portion is also preferably of octagonal cross section as shown, the blunt edges formed by the apices of the different faces assisting in the forming of the central opening to receive the needle holder.

In operation the tubing is positioned on the rollers 12 in position to have the projecting end portion thereof receive the flames from the burners and while being heated the tubing is rotated, which may be accomplished by rolling it under the palm of the hand, the heat causing the end portion to contract and thicken as shown at 10 in Fig. 2.

The forming tool is then applied to the heated end, being held in the operator's hand, the tapered pin 25 being inserted into the tube until the flange 21 bears against the end thereof and the springs compressed to cause the plates to bear on the opposite sides of the tubing the rotation of which is continued. The plug 16 is provided with a recess 16' in its end to receive the pin 25. The material is thus gradually pressed inward over the end of the plug 16 and against the flange 21 and pin 25, the parts finally assuming the position shown in Fig. 3 in which the forming of the needle carrying end is completed. As will be noted the plates 24 project partially over the plug 16 so that contraction of the plates beyond the level of the outer surface of the tubing is prevented and a smooth exterior is maintained to the extreme end of the syringe body.

After the end of the syringe body has been thus formed, the requisite length of tube to form the said body is severed in the usual manner from the main length and is placed in a cooling receptacle where an even cooling, or even decrease in temperature, of the end wall and adjacent portions of the side wall is ensured. This receptacle comprises a box 27 having an asbestos cover 28 in which is an opening of sufficient size to frictionally receive the glass body which is inserted therein with the formed end downward, the box, or the interior thereof, being first heated by suitable means to a temperature approximately that of the heated glass. The box is then allowed to cool, being preferably formed of or covered or lined with material which does not conduct heat readily so that the cooling takes place slowly. By allowing the glass to cool in this manner an even contraction of the material occurs and danger of cracking at the juncture of the end and side wall is prevented.

After the glass is cooled the entire inside surface is ground to ensure an accurate fit of the various parts.

Having thus described my invention, what I claim as new and desire to secure by Letters Patent, is:

1. The process of forming a reduced bore on the end of a glass tube, which consists in subjecting the end of a length of glass tubing to the action of heat, and then compressing said end against a block fitting within the tube to form an internal flange on said end, and removing the block through the other end of the tube.

2. The process of forming a thickened end wall having a reduced bore therein on the end of a glass tube which consists in subjecting the end of a length of glass tubing to the action of heat, inserting a block within said tube, compressing the heated end of the tube against said block and about a tapered pin to form said reduced bore and removing the block through the other end of the tube.

3. The process of forming a thickened end wall having a reduced bore therein on the end of a glass tube, with the inner side of said wall forming a right angle with the bore of said tube which consists in subjecting the end of a length of glass tubing to the action of heat, compressing the heated end of the tube between a pair of blocks, one of which is inserted within said tube and about a tapered pin located between said blocks, simultaneously subjecting the periphery of the tube to pressure to form the glass about said tapered pin and to fill the space between the blocks and thereafter removing the blocks in opposite directions from the ends of the tube.

4. A means for forming glass bodies for hypodermic syringes comprising a cylindrical plug with a flat end wall adapted to be inserted in a glass tube, and a tool comprising a tapered pin adapted for insertion in the end of the tube, a member fixed to said pin having a surface at right angles to the axis of the pin, and a pair of transversely movable plates extending forwardly from points adjacent said surface on opposite sides of the said pin.

In testimony whereof I have affixed my signature.

FRANK X. NOWAK.